W. H. NUTTER & R. H. SIMS.
INNER KETTLE OR BOILER.
APPLICATION FILED OCT. 22, 1912.
1,080,470.
Patented Dec. 2, 1913.
2 SHEETS—SHEET 1.
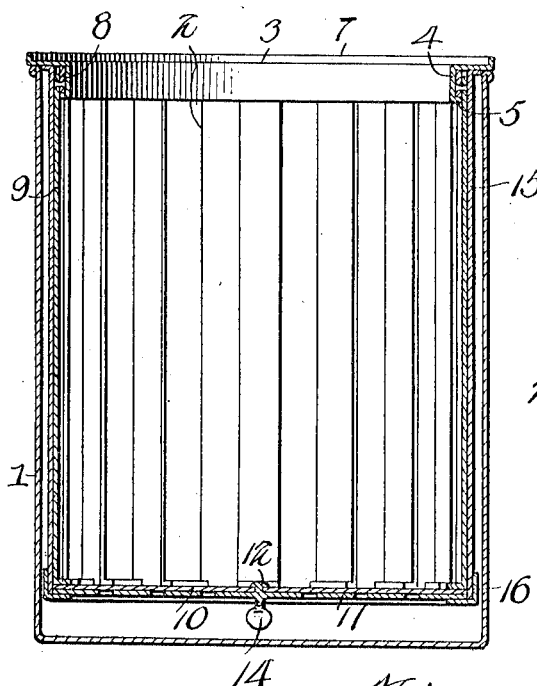
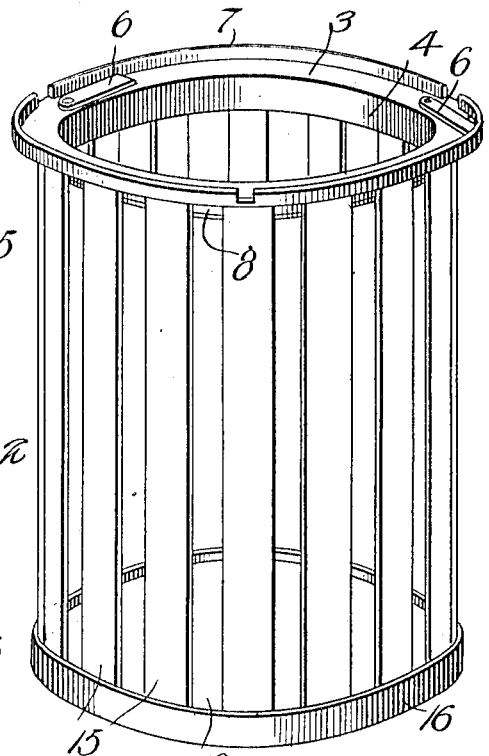
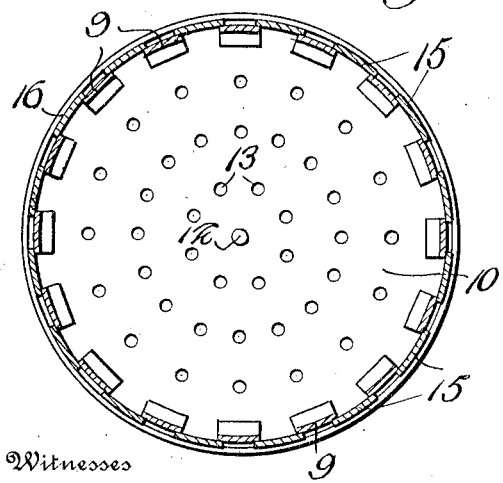
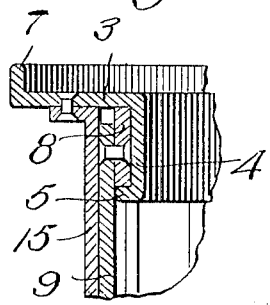
Inventors
William H. Nutter,
Robert H. Sims.
By Victor J. Evans
Attorney

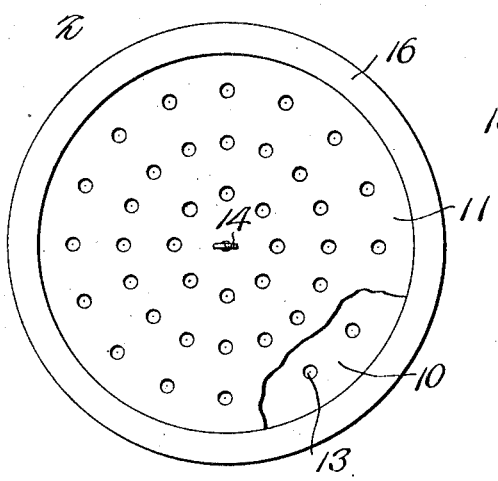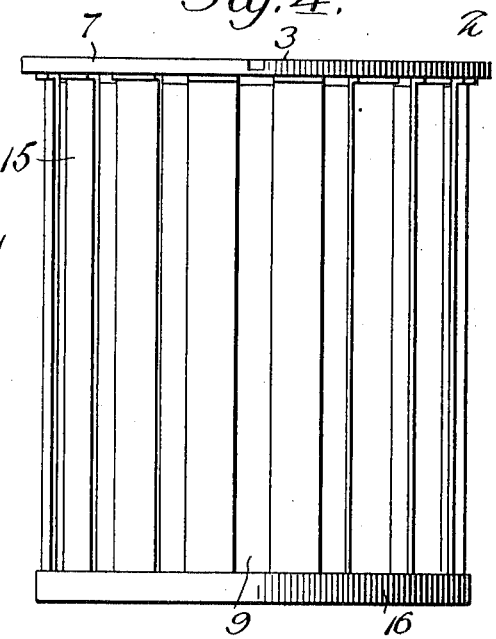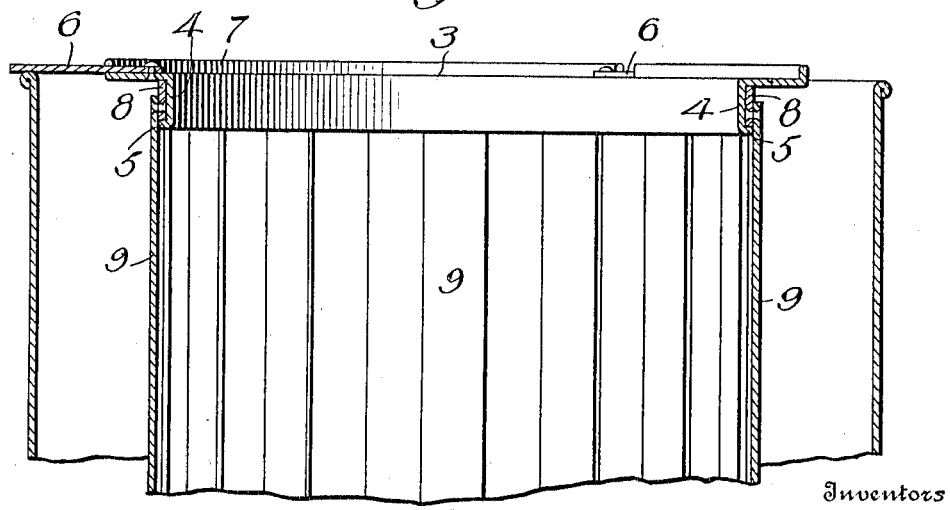

UNITED STATES PATENT OFFICE.

WILLIAM H. NUTTER AND ROBERT H. SIMS, OF LEBANON, OREGON.

INNER KETTLE OR BOILER.

1,080,470.  Specification of Letters Patent.  Patented Dec. 2, 1913.

Application filed October 22, 1912. Serial No. 727,251.

*To all whom it may concern:*

Be it known that we, WILLIAM H. NUTTER and ROBERT H. SIMS, citizens of the United States, residing at Lebanon, in the county of Linn and State of Oregon, have invented new and useful Improvements in Inner Kettles or Boilers, of which the following is a specification.

The present invention relates to cooking utensils, and especially to that class of utensils employed in connection with ordinary kettles or the like, which is adapted to receive vegetables or other articles to be cooked, and which embodies a foraminous receptacle which will allow all of the water to be drained from the cooked article as the receptacle is removed from the kettle.

In constructing a device of this class we aim to provide a receptacle which is adapted to be removably sustained within a kettle, and which has its parts so constructed and arranged as to permit of the adjustment of the sides and bottom of the receptacle to regulate the width of the openings in the sides and in the bottom.

We further aim to provide a receptacle of this class which may be readily sustained upon kettles of various sizes.

With the above recited objects in view, and others which will appear as the nature of the improvement is more fully understood, the invention resides in the construction, combination and arrangement of parts set forth in the following description and falling within the scope of the appended claims.

In the drawings, Figure 1 is a vertical central sectional view of our improved receptacle inserted within a water containing kettle. Fig. 2 is a perspective view of the receptacle removed. Fig. 3 is a bottom plan view of the receptacle and illustrating the manner in which the width of the openings in the bottom may be closed or partially closed. Fig. 4 is a perspective view of the receptacle showing the sides of the same in a closed position. Fig. 5 is a horizontal sectional view of the device as illustrated in Fig. 4. Fig. 6 is an enlarged detail sectional view illustrating the upper portion of the receptacle, and means which may be employed for sustaining the same upon an extra large kettle. Fig. 7 is an enlarged vertical longitudinal sectional view taken through the upper corner of the device illustrated in Fig. 2.

Referring now to the drawings in detail, the numeral 1 designates an ordinary cooking utensil, such as a kettle. The kettle 1, may be, and preferably is, provided with a removable lid, and the mouth of the kettle is formed with the usual continuous bead.

The numeral 2 designates our improvement. This member 2 is in the form of a foraminous receptacle and engages a top 3 which is rightangular in cross section, and which has its vertical offset portion 4 provided with an out-turned continuous lip 5. The horizontal portion of the rim is of a width sufficient to sustain the receptacle upon the beaded mouth of the ordinary cooking utensil or kettle, but when the device is to be inserted within a kettle of extraordinary size we have provided the rim 3 with a plurality of pivoted fingers 6 which are normally swung to a closed position upon the said rim. These fingers are preferably constructed of resilient material and the outer periphery of the rim is preferably formed with an upturned bead 7 which is adapted to serve as a stop for the fingers when the device is employed in connection with an ordinary sized kettle. Engaging between the horizontal portion of the rim 3 and the lip 5 is a ring 8. This ring has secured thereto the upper ends of a plurality of slats 9. The slats 9 have their lower extremities secured to a foraminous or perforated bottom 10.

The numeral 11 designates a disk or false bottom which is centrally and pivotally connected with the bottom 10 as at 12. The member 11 is provided with openings which correspond in number with the openings provided in the bottom 10, and as the said member 11 is pivotally connected with the bottom, it will be noted that by rotating the said member upon its pivot the openings 13 of the bottom 10 may be wholly or partially closed.

The pintle 12 is preferably securely connected with the disk 10 and extends therebelow to provide a handle 14 whereby the said disk may be rotated. Secured to the rim 3 and depending therefrom is a plurality of slats 15 which preferably have their lower ends connected to the L-shaped ring member 16 that surrounds the disk 11 and the bottom 10. The slats 15 are of a width slightly greater than the distance between the spaced slats 9, and it will be noted that by rotating the rim 3 the said slats 15 will partially or entirely close the spaces between the slats 9. Furthermore it is to be understood that the slats 15 frictionally contact with the slats 9, so that a comparatively tight joint between the slats is insured and whereby the spaces between the slats 9 may be regulated by the slats 15 to a nicety, and the parts sustained against accidental displacement.

Having thus described the invention, what we claim is:—

1. In an article for the purpose described, a receptacle comprising a top member providing a flanged annulus having its vertical wall provided with an outturned bead, slats secured to the horizontal member of the annulus, a cross sectional L-shaped member connecting the bottom of the slats, a ring member arranged upon the outer face of the vertical member of the annulus between the bead thereof and the horizontal member thereof, slats connected with the bead and adapted to contact with the first mentioned slats, and the second mentioned slats having their ends connected with an annular bottom, and the said bottom bearing upon the horizontal portion of the L-shaped ring.

2. In an article of the class set forth, an interior and an exterior member each having slatted walls and one revoluble around the other whereby the slats may provide a closed receptacle or an open receptacle, the top of the receptacle having an angular bead which is notched, spring fingers upon the top members, and said fingers adapted to be forced over the bead to within the notches, substantially as and for the purpose set forth.

In testimony whereof we affix our signatures in presence of two witnesses.

WILLIAM H. NUTTER.
ROBERT H. SIMS.

Witnesses:
J. E. SIMS,
GLEN O. POWERS.

Copies of this patent may be obtained for five cents each, by addressing the "Commissioner of Patents, Washington, D. C."